UNITED STATES PATENT OFFICE.

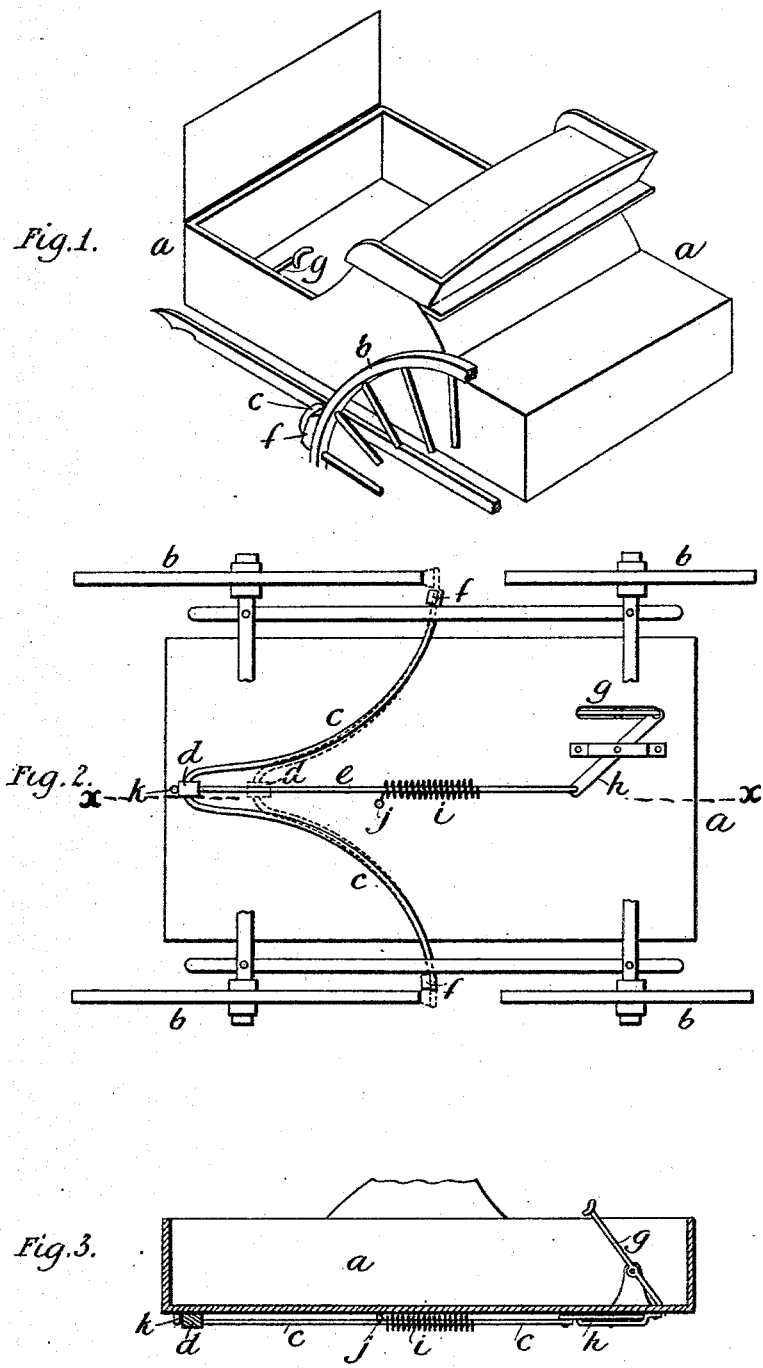

MORDECAI A. DAVIDSON AND FREDERIC R. LOCK, OF SHERIDAN, MISSOURI.

VEHICLE-BRAKE.

SPECIFICATION forming part of Letters Patent No. 514,446, dated February 13, 1894.

Application filed September 19, 1893. Serial No. 485,810. (No model.)

*To all whom it may concern:*

Be it known that we, MORDECAI A. DAVIDSON and FREDERIC R. LOCK, citizens of the United States, residing at Sheridan, in the county of Worth and State of Missouri, have invented certain new and useful Improvements in Vehicle-Brakes; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in vehicle brakes and has for its object simplicity of construction, and increased efficiency, and consists in the construction, relative arrangement and operation of the several parts all of which will hereinafter fully and clearly appear from a reading of the following description taken in connection with the accompanying drawings which form a part of this specification, and in which—

Figure 1 shows in perspective view our improved brake applied to a vehicle. Fig. 2 is a bottom plan view of said vehicle with the brake rods in their normal position in full lines, and in operative position in dotted lines; and Fig. 3 is a vertical central section taken through line $x$—$x$ Fig. 2.

The reference letter $a$ denotes the body of the vehicle, and $b\,b$ are the wheels. We have shown our brake as applied to a side bar buggy, although the same may be used with equal advantage in connection with any other class of vehicles.

$c\,c$ are the brake rods which are centrally joined to a block $d$ to which latter is also connected the rod $e$ for operating the brake. The rods $c\,c$ are curved in the arc of a quarter circle and are loosely passed through bearings in the side bars or body of the vehicle as the case may be, and terminate in brake shoes $f\,f$ which in operation engage the rim of the wheel as will be understood. The brake is operated by means of a lever $g$ which is passed through the body and is connected at its lower end with a second lever $h$ which is pivoted to a bracket on the under side of the body. The other end of this lever $h$ is connected with the rod $e$ which operates to pull the brake rods forward as shown in dotted lines, Fig. 2.

$i$ is a coil spring surrounding the rod $e$ and secured at one end thereto and at its other end to a stud $j$, and this spring operates to keep the brake in its normal or inactive state.

In operation the upper end of lever $g$ is moved by hand or foot, and causes the second lever $h$ to move therewith and carry the rod $e$ forward against the action of the spring. The brake levers are thereby moved outward against the rims of the wheels, and by reason of their curved construction the power is exerted in lines parallel with the wheels. When the lever $g$ is released the spring operates to force the parts to assume their normal positions, the brake rods being moved inward and concealed beneath the body.

$k$ is a stop for limiting the outward movement of the block $d$.

The brake when made in accordance with the foregoing is simple in construction and operation and very effective, and may be produced at small cost.

We claim—

A vehicle brake comprising in combination two curved brake rods movable longitudinally in guides on the vehicle, and carrying shoes, and connected at their ends to a movable block, operating levers, a rod connecting said levers and block, a spring operating in connection with the rod to return the parts to their normal positions.

In testimony whereof we affix our signatures in presence of two witnesses.

MORDECAI A. DAVIDSON.
FREDERIC R. LOCK.

Witnesses:
J. D. GEINDSTAFF,
OSCAR O. PAYNE.